United States Patent [19]

Woolcock et al.

[11] 4,346,383
[45] Aug. 24, 1982

[54] CHECKING THE LOCATION OF MOVING PARTS IN A MACHINE

[75] Inventors: Sydney C. Woolcock, Wells; Edwin G. Brown, Bath, both of England

[73] Assignee: EMI Limited, Hayes, England

[21] Appl. No.: 174,581

[22] Filed: Aug. 1, 1980

[30] Foreign Application Priority Data

Aug. 4, 1979 [GB] United Kingdom ................. 7927250

[51] Int. Cl.[3] .................... G01S 13/08; G01R 27/04
[52] U.S. Cl. .............................. 343/12 R; 324/35.5 B
[58] Field of Search ................... 343/12 R; 324/58.5 B

[56] References Cited

U.S. PATENT DOCUMENTS

| 3,199,103 | 8/1965 | Augustine | 343/12 R |
| 3,973,259 | 8/1976 | Hellgren et al. | 343/12 R X |
| 4,045,727 | 8/1977 | Yu et al. | 324/58.5 B |
| 4,200,921 | 4/1980 | Buckley | 343/12 R X |

FOREIGN PATENT DOCUMENTS

| 2445653 | 4/1976 | Fed. Rep. of Germany | 343/12 R |
| 1277748 | 6/1972 | United Kingdom. | |
| 1545656 | 5/1979 | United Kingdom. | |

Primary Examiner—T. H. Tubbesing
Attorney, Agent, or Firm—Fleit & Jacobson

[57] ABSTRACT

In order to monitor the clearance between turbine blades and the casing of a turbine engine millimetric microwave radiation of wavelength $\lambda$ is propagated along a waveguide and through an aperture to a turbine blade. The aperture is small in relation to the area of the blade facing the aperture, and the aperture has a spacing of $\lambda/4$ or less from the blade. A balanced mixer compares the phase of the wave reflected from the blade with a reference pulse to provide a measure of the clearance.

Circuits may be provided for monitoring the spacings between blades, and to indicate blades which are damaged.

11 Claims, 11 Drawing Figures

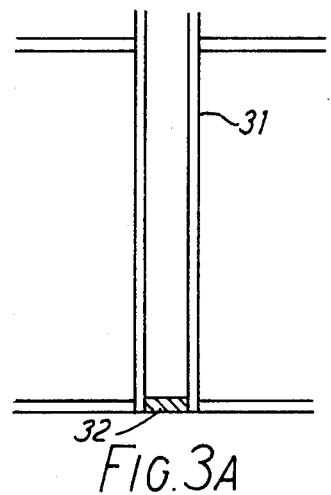
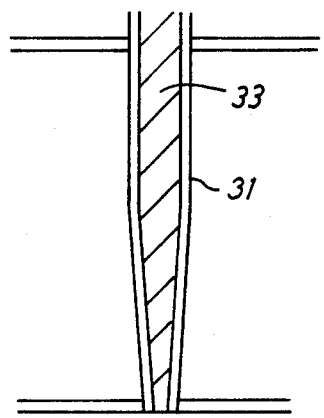
FIG.3A  FIG.3B
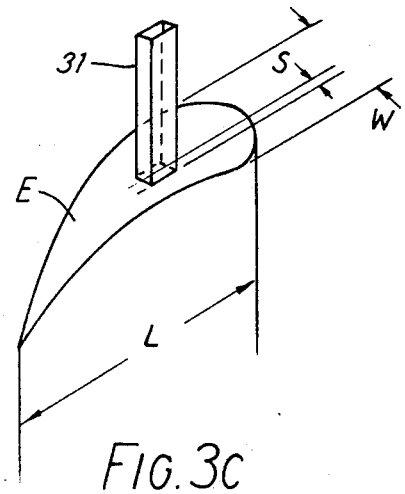
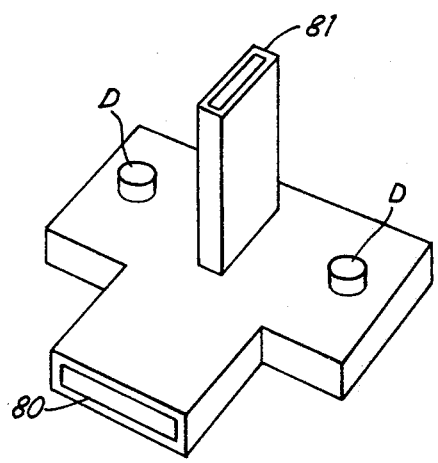
FIG.3C  FIG.8
FIG.9
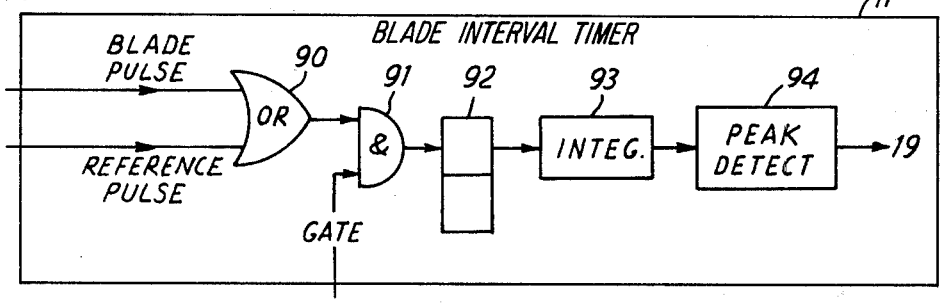

CHECKING THE LOCATION OF MOVING PARTS IN A MACHINE

BACKGROUND OF INVENTION

1. Field of Invention

The present invention relates to a method of checking the location of moving parts in a machine, and to apparatus for carrying out the method.

2. Description of Prior Art

British Pat. No. 1,545,656 (General Electric Company of New York State, U.S.A.) discloses a microwave proximity detector which is especially useful for measuring the clearances between tips of rotating turbine blades and the casing of a jet engine. In the detector, microwaves are propagated to a microwave junction to produce propagating reflected waves on one side of the junction and an evanescent electromagnetic field on the other side of the junction. Turbine blades on the said other side perturb the evanescent field and vary the reflection of the propagating waves to produce an indication of the clearance.

SUMMARY OF INVENTION

It is an object of the invention to provide, in a turbine engine comprising a set of turbine blades extending radially of an axis of rotation and a casing surrounding the set, the improvement of means for monitoring the clearance between the blades and the casing comprising:

means for producing electromagnetic waves of millimetric wavelength $\lambda$ having a reference phase, a waveguide fixed relative to the casing and having an aperture facing the said set of turbine blades, and spaced therefrom by $\lambda/4$ or less, the area of the aperture being small in relation to the radially facing cross-sectional area of any one of the said blades, the waveguide and aperture being dimensioned to allow the said waves to propagate from the producing means through the aperture, a phase detector coupled to the producing means and the waveguide to produce a signal, dependent on the phase difference between the said reference phase and the phase of the reflected waves, and further means for producing a further signal representing the amplitude of the reflected waves, thereby to indicate the presence of a blade in proximity to the waveguide.

It is a further object of the invention to provide an apparatus for monitoring the clearance between a set of turbine blades extending radially of an axis of rotation and a casing in a turbine engine comprising:

means for causing electromagnetic waves of millimetric wavelength $\lambda$ to propagate from a datum position fixed relative to the casing to the zone occupied by the blades, and means for deriving a measure of the clearance from the propagating waves reflected by the blades and from an electromagnetic wave of the said wavelength and having a reference phase, wherein the casing comprises a waveguide having an aperture which is small in relation to the radially facing cross-sectional area of any one of the turbine blades, and further means are connected to receive the reflected waves and produce therefrom blade pulses indicative of the presence of blades in the proximity of the aperture.

It is yet a further object of the invention to provide a method of monitoring the clearance between turbine blades and a casing in a turbine engine comprising propagating electromagnetic waves of millimetric wavelength $\lambda$ from a datum position fixed relative to the casing to the zone occupied by the blades and deriving a measure of the clearance from the propagating waves reflected by the blades and from an electromagnetic wave of the said wavelength and having a reference phase, wherein the waves are propagated via a waveguide having an aperture facing the blades, which is small in relation to the cross-sectional area facing the aperture of any one of the blades when adjacent the aperture, and producing, from the reflected waves, blade pulses indicative of the presence of blades in proximity of the aperture.

BRIEF DESCRIPTION OF DRAWINGS

For a better understanding of the present invention, reference will now be made, by way of example to the accompanying drawing in which FIG. 3C shows the relationship between an aerial and a turbine blade.

FIG. 8 shows a hybrid T junction, and FIG. 9 shows the blade interval timer circuit of FIG. 1.

DETAILED DESCRIPTION

Inspecting new and refurbished aircraft jet engines is a protracted and expensive business. A jet engine has many sets of rotorblade assemblies, each assembly comprising between 20 and 200 blades radiating from a hub. The blades are set so that when viewed through a small inspection hole in the casing of the engine, the edge of each blade tip appears to be at about 60° to the direction of its traverse. The gap between the blade tip and the inside of the casing is about 1 mm.

It is required to know whether the blades are equally spaced one from another, and whether the variation from one blade to another in the gap between each blade tip and the engine casing in the region of the inspection hole is within a tolerance. Furthermore variations in the gap need to be determined to an accuracy of about ±0.05 mm. The inspection needs to be carried out both when the engine is stopped and when it is operating. When the engine is operating dense hot gases flow past the blades and there is a high level of engine vibration.

Figure 1:
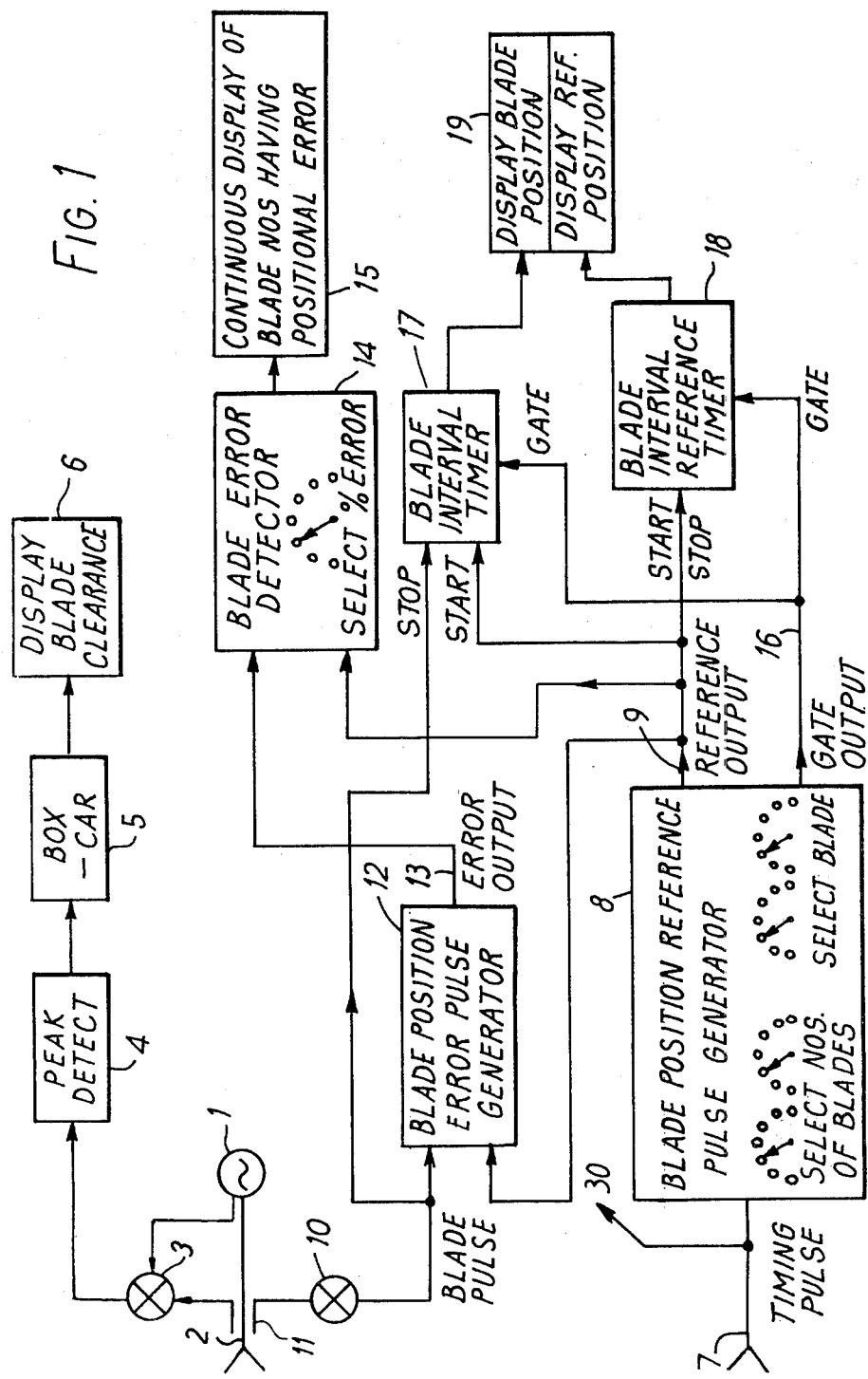
FIG. 1 is a block diagram of a microwave apparatus for use in checking the accuracy of location of turbine blades in an aircraft jet engine.

The apparatus of FIG. 1 comprises a microwave reflectometer, signal processing circuits and display devices.

Reflectometer

A crystal controlled microwave oscillator 1 feeds millimetric microwave radiation via a waveguide to an aerial 2 which transmits the radiation through the inspection hole. The oscillator could operate continuously. The aerial is in close proximity to the hole, preferably being physically attached to the engine casing to reduce phase noise due to vibrational movement of the engine casing. Referring to FIGS. 3A and B the aerial comprises for example, an inner rectangular waveguide 31 having a output window 32 of ceramic, quartz, spinel, or diamond etc. to protect the waveguide from the environment of the engine. The waveguide may be filled with ceramic 33 to minimize its size, as shown in FIG. 3B.

As each blade passes the inspection hole a short-duration microwave-reflection is obtained. The phase $\phi$ of the reflection (relative to that of the oscillator 1) is related to the gap between the blade tip and the casing. The peak magnitude of the reflection occurs at the point of closest approach of the blade to the hole. In coincidence with each magnitude peak, there is an abrupt change in the direction of the rate of change of phase because the blade is approaching the hole before the peak thereby decreasing the phase path length and receding from the hole after the peak thereby increasing the phase path length.

The choice of microwave wavelength is arbitrary but is preferably chosen to avoid phase ambiguities. For a wavelength $\lambda$, and a gap between casing and blade tip D, which varies in a range $D \pm d$, the phase $\phi$ is $$\phi = [4\pi(D \pm d)]/\lambda + \phi_o \text{ rad}$$

where $\phi_o$ is a system constant. For $\lambda = 4$ mm. and $d = 0.05$ mm., the phase variation would be $\pm 0.05$ rad. $= \pm 9$ deg. A typical maximum gap variation is $\pm 0.25$ mm so the maximum phase variation would be $\pm 45$ deg.

Problems with reflections from within the engine but not from the turbine blades, are avoided in the following manner.

Referring to FIG. 3C a turbine blade is, for example, about 4 cm long (L) and about 1 cm wide (W). The waveguide aerial 31 is closely spaced from the radially facing end (E) of the blade, the spacing S being, for example, about 1 mm being less than or equal to $\lambda g/4$ where $\lambda g$ is the guide wavelength. The critical dimension of the rectangular waveguide aerial 31 for a wavelength $\lambda$ of 4 mm i.e. $\lambda g = 5$ mm is $\lambda g/2$, i.e. 2.5 mm.

Thus the area of the end (E) of the blade is large compared to the area of the waveguide aerial 31 facing the blade.

The blade is in the near field of the microwave radiation propagating from the aerial, and being so much larger than the aerial aperture, virtually blocks the aperture.

Signal Processing to Monitor The Gap

A first signal processing circuit is provided to monitor the gap between the blade tips and the casing. A microwave phase detector 3 receives the reflected signal from the aerial 2 and also receives part of the output of the oscillator 1, mixes the reflection and the part of the output of the oscillator and produces a signal representing the difference in phase therebetween. Although the detector could be set up so that the two components it receives are in-phase when a gap of nominally correct size is detected, it is preferably set up so that the two components are in anti-phase when a gap of nominally correct size is detected; this ensures maximum sensitivity to phase change and a standard relation between polarities of gap change and corresponding measurement change.

A suitable manner of using a balanced mixer as the phase detector 3 of FIG. 1 will now be described with reference to FIG. 8. The mixer comprises a hybrid T junction as shown in FIG. 8 having an input arm called the shunt arm 80 coplanar with two colinear arms including diodes D and a further input arm called the series arm 81 perpendicular to the arms including the diodes. Normally the signal from the local oscillator 1 would be fed into input 80 and the signal to be received from the aerial into input 81. In the system of FIG. 1, the local oscillator signal is fed to input 81 and the aerial signal is fed to input 80. In other respects the balanced mixer is conventional comprising a subtractor circuit for subtracting the outputs of the diodes to produce an IF output which is fed to the peak detector 4. (See for example Introduction to Radar Systems by M. I. Skolnik, Section 8.8-McGraw Hill-1963).

The output of the detector is processed in the following manner for example.

As each blade passes the hole, the magnitude of the output of the detector reaches a peak the size of which depends on the measured phase difference. This peak is sampled for each blade in a peak detector 4 and stretched in a box-car circuit 5.

Display of Gapsize

The output of the box-car circuit may be displayed in a display device 6 such as an oscilloscope or a digital display, to indicate the size of the gap and the variation of the gap.

Signal Processing to Monitor Blade Spacing

The reflected signals from the blades also indicate the actual blade timing. To derive a pulse train in which the pulses indicate the blade timings, the signal reflected from the blades is fed alone to an envelope detector circuit 10. For good operation of the envelope detector, the signal from the oscillator 1 is suppressed using a high directivity coupler 11, and means for the cancellation of aerial mis-match reflection are incorporated. Alternatively, the reflected signal and the oscillator signal are fed to a circuit 10 comprising a phase detector which indicates the rate and sense of change of phase, and a differentiator which determines the instant of the change of the sense of phase change.

A second signal processing circuit is provided to monitor the blade spacing. The circuit has an input 7 for receiving a timing pulse, obtainable for example from the engine shaft rotation, on each rotation of the engine shaft. A blade position reference pulse generator 8 receives the timing pulses and generates a reference train of pulses in which the pulse interval equals the shaft rotation period divided by the number of blades, thereby indicating an ideal blade spacing. This reference train is outputted on a reference output 9.

The timing of the pulses of the reference train is compared with the actual blade timing which is derived from the reflectometer. The comparison takes place in a blade position error pulse generator 12, which receives the reference train and a train of blade pulses indicating actual blade timing from the circuit 10, and produces at an output 13, an output error pulse train in which each pulse has, for example a width proportional to the difference in timing between the actual blade timing and the corresponding reference timing. The generator 12 includes a circuit to generate a signal indicating a missing blade and an example of it is described in detail hereinafter with reference to FIG. 4. The error pulse train is fed to a blade error detector circuit 14 which also receives the reference train from generator 8. The circuit 14 indicates whether or not the width of each error pulse is greater than a reference width which is a selected percentage of the width of a pulse of the reference train. The reference width or % timing error is selectable over a range. An example of the circuit 14 is described hereinafter with reference to FIG. 5.

A display circuit 15 receives from the detector circuit 14 signals indicating the occurrence of a blade having a percentage timing error exceeding the reference error. The circuit has a numerical display for identifying blades in error. An example of it is described hereinafter with reference to FIG. 6.

Further circuits are provided to measure and display the position errors of each of the blades indicated by the display 15. These circuits use a gating waveform produced by the reference pulse generator 8, at an output 16, this gating waveform having a time interval associated with a blade of interest.

The blade pulses produced by circuit 10 are fed to circuit 17 which is triggered by the gating waveform and provides an output related to the timing of a particular blade of interest. The timer 17 measures the time interval between a start pulse, derived from the pulse of the reference train occurring before the blade pulse representing the blade of interest, and a stop pulse which is the blade pulse of interest.

A blade interval reference timer 18 is provided which receives the gating waveform and the reference train and measures the interval between successive pulses of the reference train occurring at the time defined by the gating waveform.

A display device 19 is arranged to display the intervals measured by the timers 17 and 18.

A schematic diagram of a simple example of a circuit which may be used as the blade interval timer 17 is shown in FIG. 9. The blade and reference pulses are fed via an OR gate 90 to an AND gate 91 which also receives the gating waveform in the presence of the gating pulses, the blade and reference pulses set and reset a bistable 92 to produce pulses of length dependent on the difference in times of occurrence between the blade and reference pulses. These pulses are integrated by an integrator 93 and the peak values of the integrated pulses detected using a peak detector 94. The output of the peak detector is fed to the blade position display portion of display 19.

The blade interval reference timer 18 is identical to the circuit shown in FIG. 9, except that the OR gate 90 is removed.

The display 19 may in a simple form comprise for example two digital voltmeters indicating the values of the output voltages of the peak detectors of timers 17 and 18.

Figure 2:
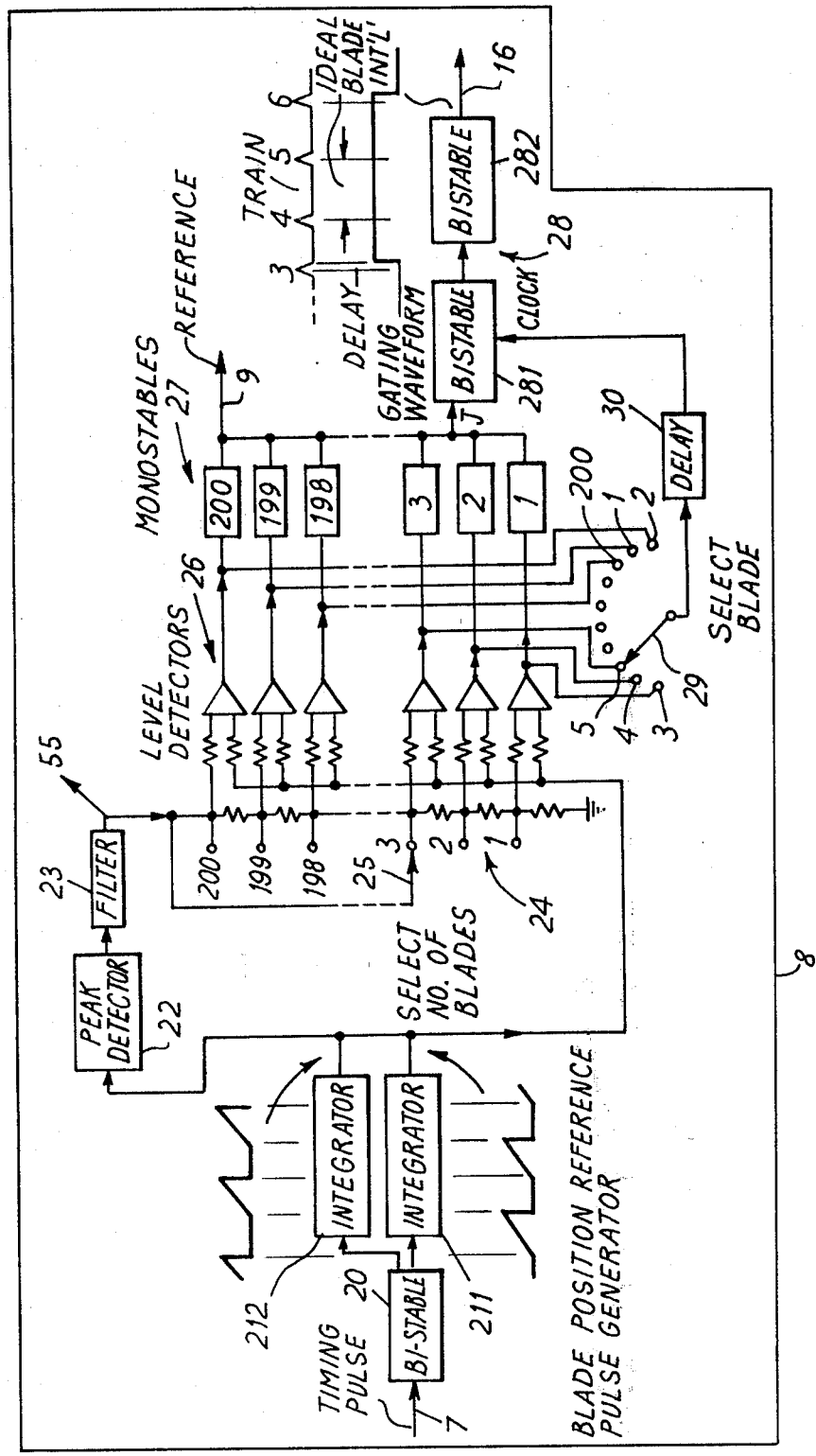
FIG. 2 is a block diagram of a portion of FIG. 1, FIGS. 3A and B show, schematically, aerials for use in the apparatus.

FIG. 2 shows an example of the blade position reference pulse generator 8. It is important that the generator 8 will operate correctly at all engine speeds. A bistable 20 and integrators 211 and 212 produce respective sawtooth waveforms (in anti-phase) in response to the timing pulses received at the input 7. The sawtooth waveform from integrators 211 and 212 are applied to a peak detector 22 and filter 23 which apply the peak value of the waveform to a selected one of, e.g. 200 tappings on a potential divider chain 24 comprising e.g. 200 resistors in series. The number of tappings and resistors is chosen to equal the maximum number of blades in one blade set in a jet engine. The tapping to which the peak value is applied is selected by a selector switch 25. In FIG. 2, the switch 25 is set to select a set of 3 blades.

Level detectors 26, there being one per tapping, each have a first input connected to a respective tapping, to receive therefrom a reference potential, and a second input connected to the integrators 211 and 212 to receive the sawtooth waveforms. Associated with each level detector 26 is a monostable 27 which is triggered to produce a pulse whenever the level detected by its associated level detector at its second input first exceeds the reference potential at its first input. In this way a train of brief pulses is produced, this train being the reference train.

The gating waveform is produced by a divider circuit, 28, comprising two bistables 281 and 282. The first bistable 281 has a clock input CLOCK which is selectively connectable via a delay 30 to the output of any one of the level detectors by a selector switch 29 and a data input J connected to receive the reference train.

The second bistable 282 is connected to the output of the first.

The switch 29 is arranged so that when set to select a particular blade x, its wiper is actually connected to the output of the level detector 26 associated with blade (x-2). The operation of the circuit is then as follows; assuming blade 5 is selected. The output of level detector 3 after a short delay, clocks bistable 281 putting the divider circuit 28 into its active state. The next reference pulse (i.e. that corresponding to blade 4 and level 4 then starts the two timers 17 and 18 and the blade pulse following that (i.e. corresponding to blade 5) stops the blade timer 17. (The delay 30 ensures that the timers 17 and 18 are not started by the output of level detector 3). The production of the reference pulse corresponding to blade 6 deactivates the divider circuit 28 and thus the timers 17 and 18.

Figure 4:
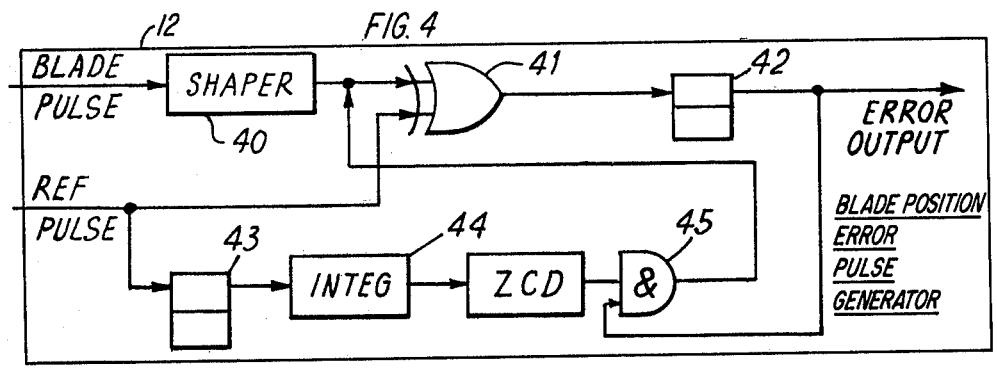
FIG. 4 is a block diagram of the blade position error pulse generator of FIG. 1.

An example of the blade position error pulse generator 12 is shown in FIG. 4. A pulse shaper 40 receives the blade pulses from the envelope detector circuit 10 and feeds shaped blade pulses to an Exclusive OR gate 41 which also receives the reference pulses. The output of the gate 41 is applied to a bistable 42. Assuming there are no missing blades, it is apparent from FIG. 7 that the output of bistable 42 is a pulse of width equal to the difference in timings of each blade pulse and its associated reference pulse.

If a blade pulse is missing (e.g. pulse 5 in FIG. 7,) the output of bistable 42 is a pulse of width corresponding to half the interval between successive reference pulses. This pulse is generated by applying the reference pulse to a bistable 43 the output of which is integrated by an integrator 44. A zero-crossing detector ZCD operating on the output of the integrator then produces a pulse indicating half the interval between successive reference pulses, and which is applied to an AND gate 45. If a blade pulse is missing the bistable 42 will still be in its logical '1' state at the time of production of the output pulse of the detector ZCD, and so AND gate 45 will be open to allow the pulse to be applied via the gate 41 to the bistable to reset the bistable 42.

Figure 5:
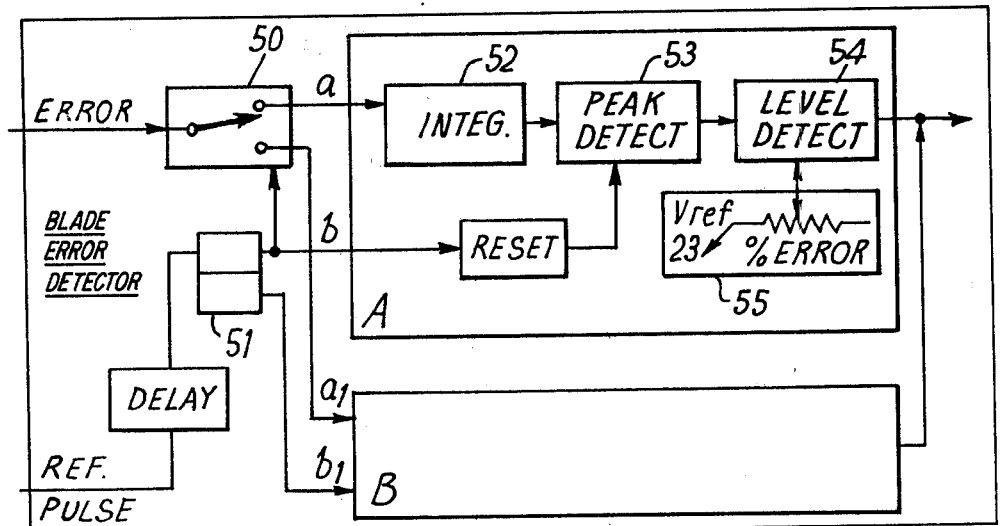
FIG. 5 is a block diagram of the blade error detector of FIG. 1.
Figure 7:
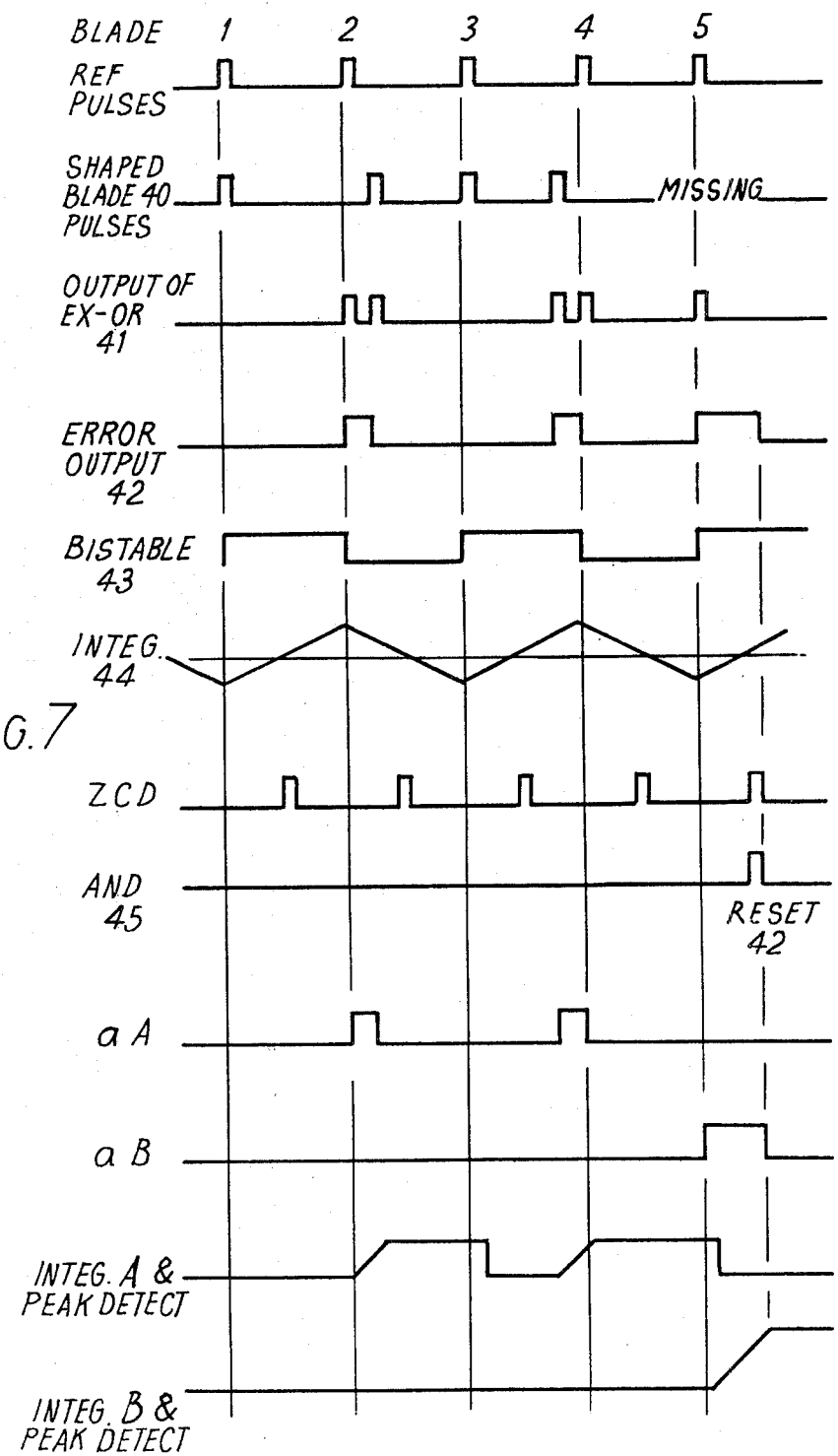
FIG. 7 is a waveform-timing diagram explaining the operation of the circuits of FIGS. 4 and 5.

FIG. 5 shows an example of the blade error detector 14. Referring to FIGS. 5 and 7, successive error outputs of the bistable 42 of FIG. 4 are applied via a switch 50 alternately to two identical circuits A and B. The switch is controlled for this purpose by a bistable 51 which receives the reference pulses via a delay circuit.

Referring to circuit A, an integrator 52 integrates the error pulses received at an input a and a peak detector 53 detects and stores the peak level. A level detector 54 compares the peak level with a reference level selected by a circuit 55 which comprises a potential divider to which is applied a reference voltage V ref derived for example from the output of filter 23 of FIG. 2. The peak detector is reset by the reference pulse following the reference pulse associated with the blade error being detected.

Figure 6:
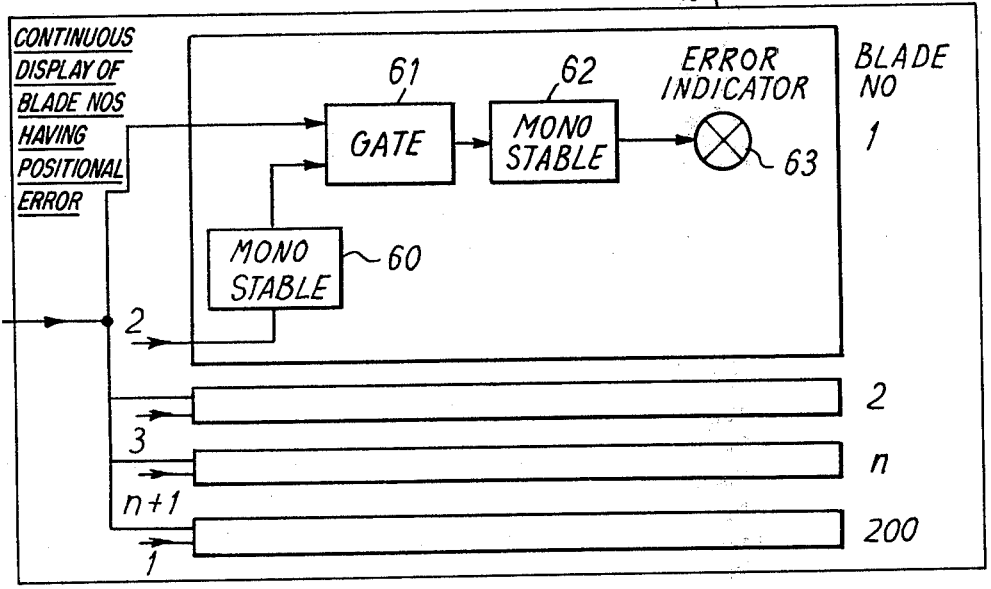
FIG. 6 is a block diagram of the display circuit of FIG. 1.

An example of the display circuit 15 is shown in FIG. 6. It comprises in this example 200 identical channels of which the channel associated with blade No. 1 is shown in detail.

The channel shown comprises a monostable 60 which is triggered by the output of an associated level detector 26 of FIG. 2. A gate 61 is enabled by the monostable to pass an output from the level detector 54 of FIG. 5 to a further monostable 62 which actuates an indicator lamp 63 which identifies any blade in error by more than the % error selected by circuit 55 of FIG. 5. In order to process the error output associated with blade n the gate is enabled (via the monostable) by the pulse generated by level detector (n+1) of FIG. 2.

The reflectometer 1, 2 and signal processing circuit 3, 4, 5, may be used for in-flight monitoring of the gap between the blade tips and the engine shroud. In an example of such use, one reflectometer is placed in the engine casing opposite each ring of turbine blades. The processed outputs of the gap-sensing reflectometers are used to operate servo-mechanisms which control the effective diameter of the engine shroud.

The reflectometer 1, 2 and signal processing circuit 3, 4, 5 could be used to check clearance between any rotating member and its casing e.g. the air gap in an electrical machine.

Similarly the reflectometer 1, 2 and signal processing circuits 10 to 30 could be used to monitor spacings between elements moving past a monitoring station in machines other than jet engines.

What we claim is:

1. In a turbine engine comprising a set of turbine blades extending radially of an axis of rotation and a casing surrounding the set, the improvement of means for monitoring the clearance between the blades and the casing comprising:

means for producing electromagnetic waves of millimetric wavelength λ having a reference phase, a waveguide fixed relative to the casing and having an aperture facing the said set of turbine blades, and spaced therefrom by λ/4 or less, the area of the aperture being small in relation to the radially facing cross-sectional area of any one of the said blades, the waveguide and aperture being dimensioned to allow the said waves to propagate from the producing means through the aperture, a phase detector coupled to the producing means and the waveguide to produce a signal, dependent on the phase difference between the said reference phase and the phase of the reflected waves, and further means for producing a further signal representing the amplitude of the reflected waves, thereby to indicate the presence of a blade in proximity to the waveguide.

2. A turbine engine according to claim 1, wherein the phase detector comprises a balanced demodulator.

3. A turbine engine according to claim 1 or claim 2, wherein the phase detector comprises a hybrid T junction having a shunt arm connected to the waveguide to receive the reflected waves and a series arm connected to the producing means to receive the wave having the reference phase.

4. Apparatus for monitoring the clearance between a set of turbine blades extending radially of an axis of rotation and a casing in a turbine engine, comprising:

means for causing electromagnetic waves of millimetric wavelength λ to propagate from a datum position fixed relative to the casing to the zone occupied by the blades, and means for deriving a measure of the clearance from the propagating waves reflected by the blades and from an electromagnetic wave of the said wavelength and having a reference phase, wherein the casing comprises a waveguide having an aperture which is small in relation to the radially facing cross-sectional area of any one of the turbine blades, and wherein further means are connected for receiving the reflected waves and producing therefrom blade pulses indicative of the presence of blades in the proximity of the aperture.

5. Apparatus according to claim 4, further comprising means having an input for receiving timing signals indicative of the period of rotation of the said set of turbine blades, and another input for receiving the said blade pulses, the means being adapted to compare an interval between successive ones of the said blade pulses with a predetermined fraction of the said period of rotation.

6. Apparatus according to claim 5, comprising a reference pulse generator having an input for receiving the timing signals, and adapted to produce reference pulses having a repetition rate which is a preselectable multiple of the period of the timing signals.

7. Apparatus according to claim 6, further comprising means responsive to the blade pulses and the reference pulses to produce signals indicative of the differences in timing of the blade and reference pulses.

8. Apparatus according to claim 7, further comprising means for selecting those signals indicative of differences in timing of the blade and reference pulses exceeding a selectable amount.

9. Apparatus according to claim 4, 5, 6, 7 or 8, further comprising means for producing a gating pulse at a selectable time after the reception of a timing signal.

10. Apparatus according to claim 9, further comprising means responsive to the blade pulses, the reference pulses and the gating pulses to produce a signal indicative of the time interval between the occurrence of a blade pulse and a reference pulse occurring within the duration of the gating pulse.

11. A method of monitoring the clearance between turbine blades and a casing in a turbine engine comprising propagating electromagnetic waves of millimetric wavelength λ from a datum position fixed relative to the casing to the zone occupied by the blades and deriving a measure of the clearance from the propagating waves reflected by the blades and from an electromagnetic wave of the said wavelength and having a reference phase, wherein the waves are propagated via a waveguide having an aperture facing the blades, which is small in relation to the cross-sectional area facing the aperture of any one of the blades when adjacent the aperture,
and producing, from the reflected waves, blade pulses indicative of the presence of blades in the proximity of the aperture.

* * * * *